No. 614,539. Patented Nov. 22, 1898.
N. H. EDGERTON.
SECONDARY BATTERY.
(Application filed Sept. 14, 1897.)
(No Model.)
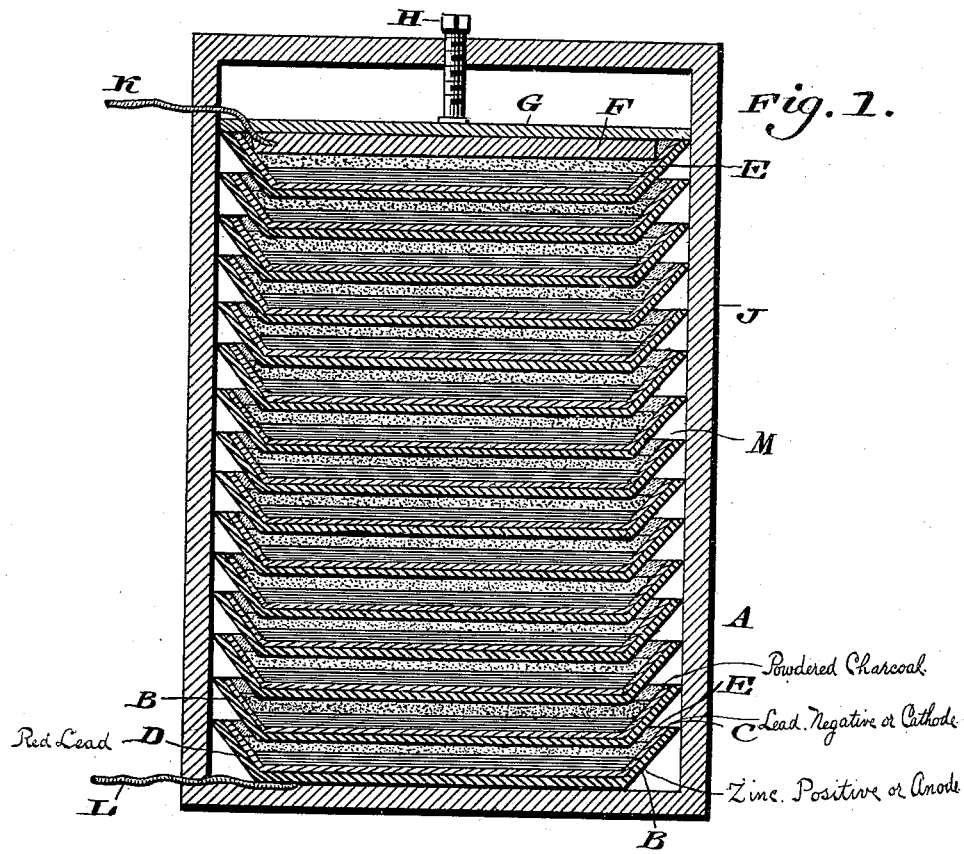
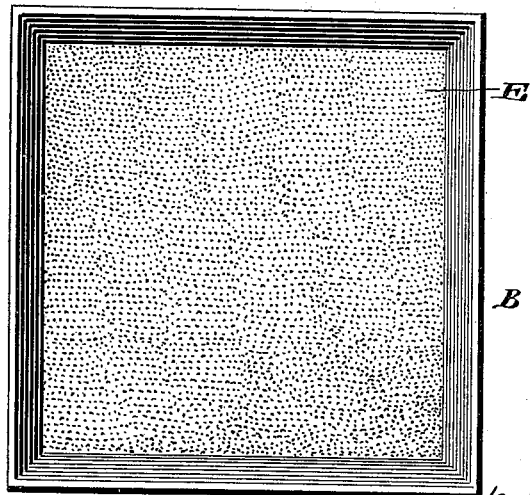
WITNESSES
INVENTOR.
Nathan H. Edgerton,
BY
Wiederoheim & Fairbanks
ATTORNEYS

UNITED STATES PATENT OFFICE.

NATHAN H. EDGERTON, OF PHILADELPHIA, PENNSYLVANIA.

SECONDARY BATTERY.

SPECIFICATION forming part of Letters Patent No. 614,539, dated November 22, 1898.

Application filed September 14, 1897. Serial No. 651,598. (No model.)

*To all whom it may concern:*

Be it known that I, NATHAN H. EDGERTON, a citizen of the United States, residing in the city and county of Philadelphia, State of Pennsylvania, have invented a new and useful Improvement in Secondary Batteries, which improvement is fully set forth in the following specification and accompanying drawings.

My invention relates to secondary batteries of the high-tension type, and has for its object the production of a battery of greater compactness and efficiency and lighter weight than heretofore.

It further consists of novel details of construction, all as will be hereinafter fully set forth, and particularly pointed out in the claims.

Figure 1 represents a vertical sectional view of a secondary battery embodying my invention, showing also the casing inclosing the same. Fig. 2 represents a plan view of one of the plurality of pans or elements seen in Fig. 1.

Similar letters of reference indicate corresponding parts in the figures.

In carrying out my invention I prepare a plate of two dissimilar metals, either sweated, electroplated, or otherwise, laid closely together, the one side forming an oxidizable plate and the other a conducting-plate. These plates are assembled in piles, with like faces of the plates all set in the same direction. On the surface of the conducting-plate I put a coating of active material adapted to absorb oxygen, then upon that a material for absorbing and holding the electrolyte, then again on top of this I set the oxidizable plate, and so extend the pile until the desired potential or voltage is reached.

In the preferred embodiment of my invention, A designates an inclosing casing, within which are contained the elements of the secondary battery, the same consisting of the zinc or oxidizable plate, pan, or dish B, constituting the positive electrode during discharge, which has its upper or interior surface coated with the conducting-plate of lead C, constituting the negative electrode during discharge.

D designates a coating of red lead which is superimposed upon the lead C, said red lead supporting a layer of powdered or granulated charcoal E, said charcoal being a relatively poor conductor. Upon the granulated charcoal I place the next zinc pan or element B, the same being provided with lead, red lead, and charcoal, assembled in the order named, as hereinbefore described, each zinc pan or dish being superimposed upon its neighbor in substantially the manner indicated in Fig. 1. The layer of charcoal E contained in the upper zinc plate or pan is provided with a plate F, of zinc or other material, over which extends a second plate or bar G, the latter being held in place by the threaded stem H, which passes through the top of the casing A and contacts with said plate G, of wood or other non-conducting material, thereby holding the different elements in the battery closely in juxtaposition.

K and L designate conductors for conveying electricity to and from the battery.

The space above the charcoal or other absorbent material in each pan, if desired, may be filled with any insulating cement or liquid M to prevent the evaporation of the electrolyte by contact with the air.

It will be evident from the foregoing that the essential features of my invention are a series of composite plates or pans each consisting of dissimilar metallic electrodes in contact forming a couple, the positive electrode or anode consisting of a suitable oxidizable material, such as zinc, and the negative electrode or cathode, such as lead, being covered with active material, such as red lead, the latter being capable of further oxidation.

It will of course be evident that while I have specified my improved battery as being composed of a plurality of zinc plates or pans having lead, red lead, and granulated charcoal juxtaposed in the manner described I do not desire to be limited thereto in every instance, but reserve to myself the right to make all such changes as will come within the scope or spirit of my invention.

Having thus described my invention, what I claim as new, and desire to secure by Letters Patent, is—

1. In a storage battery of high tension, a series or pile of pans placed substantially parallel with each other, each pan being formed of two dissimilar metallic electrodes in contact forming a couple, one side of each pan being an oxidizable metal, and the other side thereof having adjacent thereto an active material capable of further oxidation, the similar faces of said pans facing in the same direction, and a moisture-absorbing material placed between the adjacent sides of neighboring pans for holding the electrolyte.

2. A secondary battery having a series of superposed plates, each consisting of a zinc element, a coating of lead applied thereto, said lead having a layer of red lead superimposed thereupon, and granulated non-conducting charcoal supported upon said red lead.

3. A secondary battery consisting of a plurality of superposed zinc plates or pans, each of the latter being provided with a lead coating, a layer of red lead superimposed upon said lead and powdered or granulated non-conducting charcoal superimposed upon said red lead, a superimposed zinc plate or pan located above said charcoal, a conducting-plate supported upon the charcoal contained in the upper zinc pan, a casing for the battery and a threaded stem passing through the top of said casing and engaging said top plate.

4. A secondary battery having a series of superposed composite plates or pans, each consisting of dissimilar metallic electrodes in contact forming a couple, one electrode being covered with an oxidizable material, and the other electrode being covered with non-conducting absorbent material, the space above said absorbent material and between the adjacent pan containing an insulating material adapted to prevent evaporation of the electrolyte.

5. A secondary battery having a series of superposed plates or pans, each consisting of a zinc element, a coating of lead applied thereto, said lead having a layer of red lead thereupon, non-conducting absorbent material supported upon said red lead, and a suitable insulating material located in the space above said absorbent material and between each pan, said insulating material being adapted to prevent the evaporation of the electrolyte.

6. A battery having a series of superposed pans, each consisting of a zinc element, a coating of lead applied thereto, said lead having a layer of red lead thereupon, and non-conducting absorbent material supported on said red lead, in combination with insulating material located in the space above said absorbent material and between the superimposed pans, and means for holding said pans in assembled position.

NATHAN H. EDGERTON.

Witnesses:
E. HAYWARD FAIRBANKS,
WM. C. WIEDERSHEIM.